United States Patent [19]

Demarest et al.

[11] 4,117,527
[45] Sep. 26, 1978

[54] SOLID STATE VALVE THERMAL PROTECTION FOR HVDC POWER CONVERTERS

[75] Inventors: Donald Monroe Demarest, Wallingford; Edgar Frank Chandler, Media, both of Pa.

[73] Assignee: General Electric Company, Philadelphia, Pa.

[21] Appl. No.: 781,279

[22] Filed: Mar. 25, 1977

[51] Int. Cl.$^2$ .......................... H02H 5/04; H02H 7/14
[52] U.S. Cl. ..................................... 361/103; 361/106; 73/362 SC; 323/68; 323/69; 340/598
[58] Field of Search .................. 361/106, 103; 323/68, 323/69; 340/228 R; 73/342, 362 SC

[56] References Cited

U.S. PATENT DOCUMENTS

| 3,622,849 | 11/1971 | Kelley, Jr. et al. ............... 361/103 X |
| 4,001,649 | 1/1977 | Young .................................... 361/106 |
| 4,052,744 | 10/1977 | Boothman et al. ................... 361/103 |

*Primary Examiner*—J. D. Miller
*Assistant Examiner*—Patrick R. Sake
*Attorney, Agent, or Firm*—William Freedman; Charles W. Helzer

[57] ABSTRACT

A thermal protection system is provided for a solid state valve that includes at least one representative thyristor having a junction and a heat sink system. The protection system comprises a thermal analog model whose electrical network dynamic electrical operating characteristics are electrically analogous to the thermal characteristics of the solid state valve for any given value of instantaneous load current supplied through the valve, which thermal characteristics include the heat transfer to cooling fluid capability characteristics of said representative thyristor including its heat sink system. A first electrical signal is derived which is representative of the value of the D.C. load current through said valve. A D.C. current to watts generation simulation network responsive to the first electric signal is provided for deriving an output electrical signal representative of the instantaneous value of the watts being dissipated within the junction of said representative thyristor for a given value of load current flowing through said junction. The watts-being-generated signal is applied to said thermal analog model and an output electric signal is derived from said thermal analog model which is representative of the temperature of said thyristor junction.

The thermal analog model comprises an RC ladder network having the signal from the simulation network applied to one of its terminals. To another terminal of the ladder network is applied an electric signal representative of the instantaneous temperature value of the cooling fluid flowing over said solid state valve means and said heat sink system.

21 Claims, 14 Drawing Figures

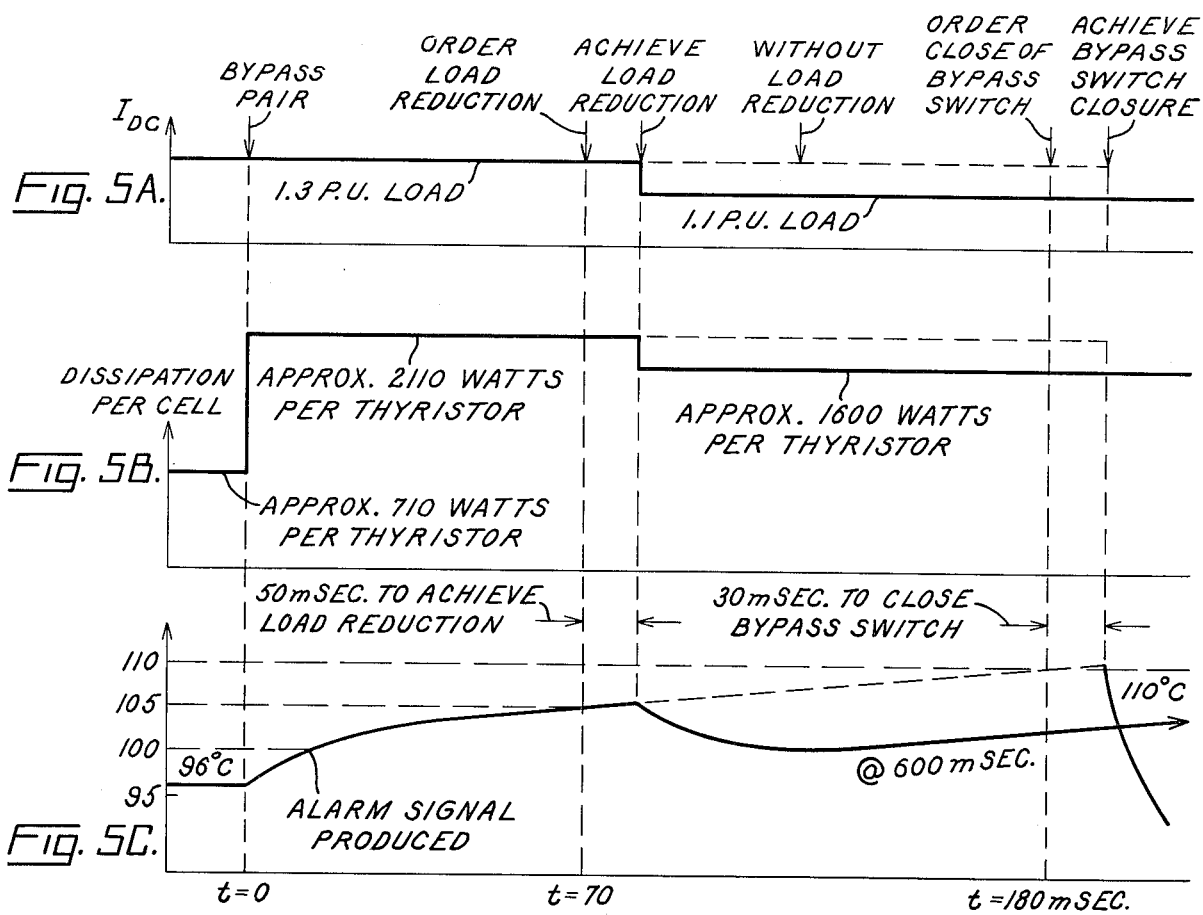
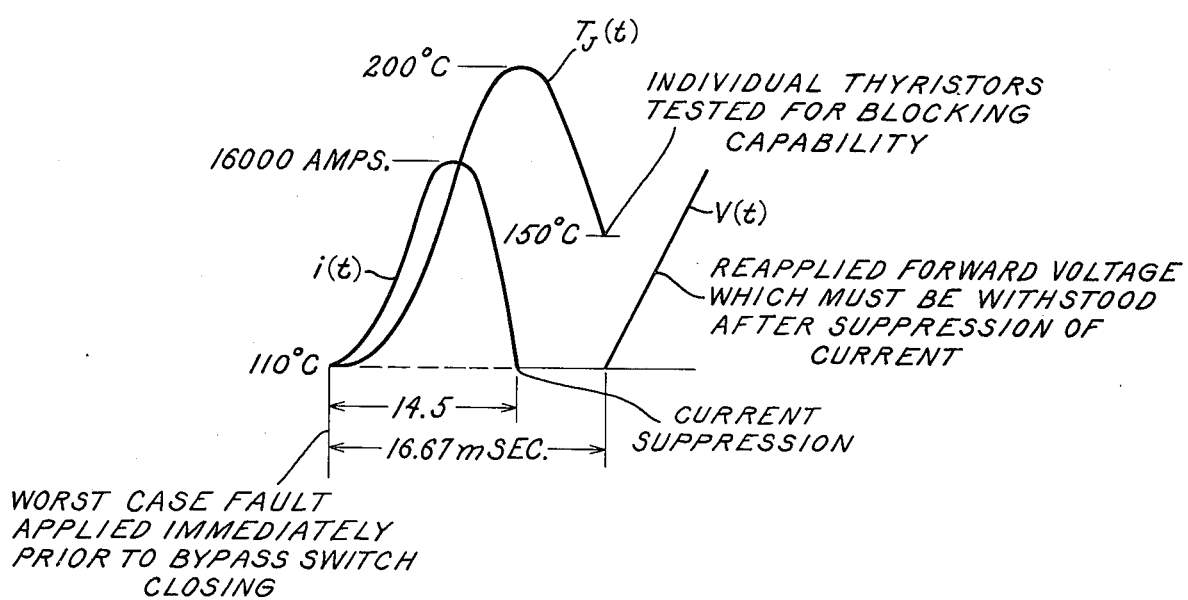
Fig. 6.
TYPICAL FORM OF CELL CURRENT AND TEMPERATURE EXCURSION FOLLOWING THEORETICAL WORST CASE FAULT

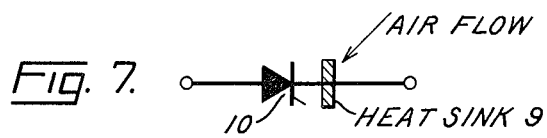
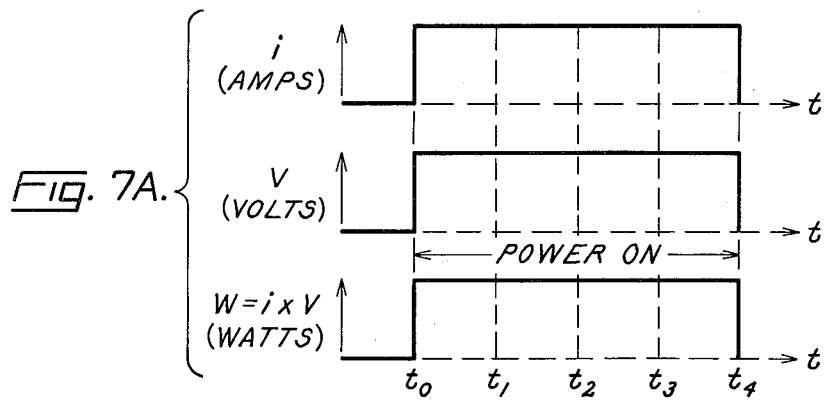
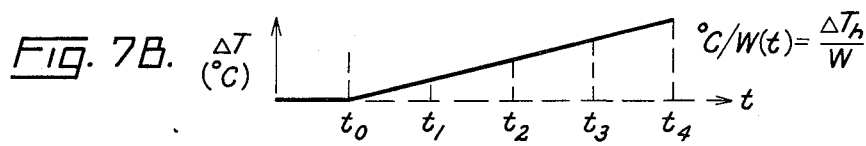
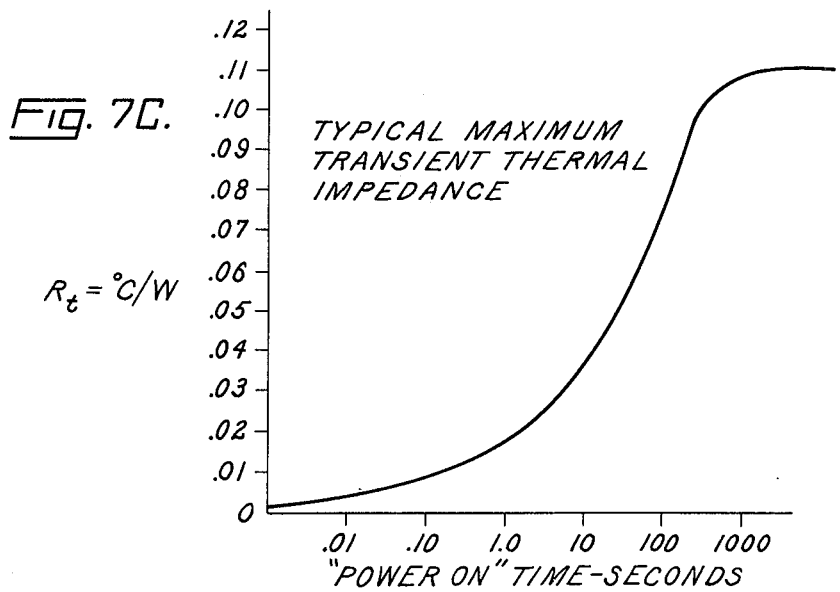
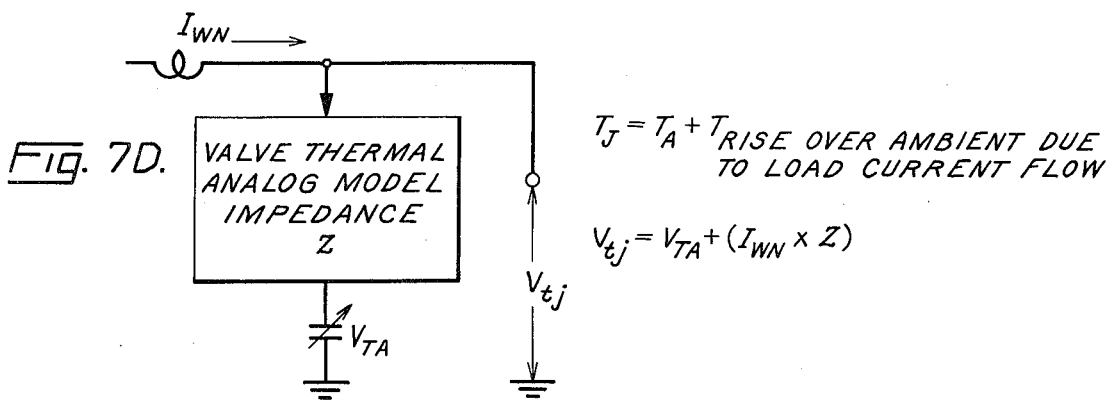

SOLID STATE VALVE THERMAL PROTECTION FOR HVDC POWER CONVERTERS

BACKGROUND OF INVENTION

1. Field of Invention

This invention relates to a new and improved solid state valve thermal protection system.

More particularly, the invention relates to such valve thermal protection systems for use with solid state valves employed in high voltage direct current power transmission system converters where direct monitoring of junction temperature is impractical.

2. Prior Art Problem

High voltage direct current (HVDC) power transmission system converter valves are designed with momentary overload capability considerably in excess of their steady state rating. If this momentary overload capability could be utilized safely in the system's operation, the HVDC link could more effectively be used in stabilizing momentary AC system disturbances thereby facilitating system operation. Much of the momentary overload capability could not be utilized if the controls for an HVDC system were designed to limit load current to a worst case steady-state rating which typically might be 1.10 per unit. In order to take advantage of whatever momentary overload capability might be available with any given set of HVDC solid state valves, it is necessary that the controls be designed to allow loads considerably in excess of the steady-state rating; however, it is essential that the duration and amplitude of the overload be limited within a very short time frame when it becomes known that the solid state valve junction temperature is approaching its design limit for maintaining its suppression capability. The present invention makes available a solid state valve thermal protection system for HVDC power converters which enables the solid state valves to be operated in a manner which may take advantage of their momentary overload capability during AC system and other disturbances and which continuously monitors the predicted instantaneous junction temperature of a representative thyristor in said valves so as to immediately signal the need for a reduction in load current should said predicted junction temperature approach its design limit for suppression capability.

The heart of the solid state valve thermal protection system is a solid state valve thermal analog model. This model is in effect an analog computer which is supplied with current input signals representative of the instantaneous heat dissipation within a representative thyristor of the solid state valves, the valve ambient temperature and a signal indicating whether the valves are operating in a blocked or bypass condition (which represents a tripling of the duty on the conducting valves). The solid state valve thermal analog model converts these input signals into a voltage output signal which is continuously analogous to the solid state thyristor junction temperature. This is achieved via circuitry which is designed to simulate the transient thermal resistance characteristics of the solid state thyristor junction and heat sink system to ambient cooling fluid.

U.S. Pat. No. 3,622,849 issued Nov. 23, 1971 to Fred W. Kelley, Jr. of the General Electric Company, discloses a circuit for monitoring the junction temperature of a conducting thyristor by measuring the temperature of a reference point and synthesizing the thermal response of the physical configuration between the thyristor junction and the reference point. The Kelley circuit; however, is designed for use on the AC side of a system and is not effective to measure valve junction temperature during abnormal conditions on the DC side of an HVDC power transmission system such as electronic bypass, commutation failure or blocking. In addition, the Kelley circuit is not designed to include the dynamic effect of ambient temperature changes. Finally, the present invention differs over the Kelley circuit in that it includes a trim capability to compensate for valve dissipation which is not load dependent such as switching, $\frac{1}{2} LI^2$ and other voltage losses, and to compensate for dependence of thermal impedance on quantity of valve cooling fluid flow. U.S. Pat. No. 3,643,130 describes a supervisory device for semiconductor thyristor rectifiers and which employs a thermal replica utilizing an RC component having a variable resistance and capacitor with the variable resistor being comprised by at least one controllable semiconductor resistor. The supervisory device disclosed in U.S. Pat. No. 3,643,130 likewise is designed for use with alternating current systems and includes no automatic means for immediately increasing the thermal replica response upon the onset of an increase in duty cycle such as occurs in an HVDC power transmission system during abnormal conditions such as when the solid state valves of an HVDC power converter are placed in a bypass pair conduction condition. when in bypass pair condition certain of the valves are in a continuous conduction condition as opposed to conduction during only one third of a normal power system cycle in any one valve as occurs during normal operation. Because of the above-discussed characteristics, the prior art devices cannot satisfactorily be used to monitor the performance of the solid state valves of an HVDC power converter where it is desired to operate the HVDC power transmission system in a manner which takes advantage of the momentary overload capability inherently possessed by the valves while maintaining the integrity of the valves' suppression capability, which is the major protection feature of the system.

SUMMARY OF INVENTION

It is therefore a primary object of the present invention to provide a new and improved solid state valve thermal protection system that is particularly useful in protecting the valves of an HVDC power converter used in HVDC power transmission systems wherein it is desired to employ inherent momentary over-load capability of the HVDC solid state valves to dampen AC system disturbances, etc.

Another object of the invention is to provide such a solid state valve thermal protection system which is capable of better protecting the solid state valves of large power rated converters due to the fact that the improved thermal protection system includes in its operation provision for heat dissipation effects of the heat sink system and accomodates dynamic changes in the ambient temperature and thereby more accurately predicts temperature rises in the valves and allows the valves to be employed in systems designed to take advantage of the momentary overload capability of the valves safely with lower rated (and hence, lower cost) components that could not maintain such overloads on a sustained basis.

A still further object of the invention is to provide a valve thermal protection system having the above set forth characteristics which, due to the use of redundant channels and built-in internal monitoring capability, reduces the probability of failure of the valve thermal protection system to a very low order.

In practicing the invention in one form, a thermal protection system is provided for solid state valve means that includes at least one representative thyristor having a junction and a heat sink system for transferring heat from said junction to cooling fluid flowing past said heat sink system. The protective system comprises a solid state valve thermal analog model comprising an electrical network whose dynamic electrical characteristics are analogous to the thermal characteristics of the solid state valve means for a given value of instantaneous D.C. load current supplied through said valve means, which thermal characteristics include the heat transfer to cooling fluid capability characteristics of said representative thyristor (including its heat sink system). In using the model, means are provided for deriving a first electric signal representative of the value of the D.C. load current through the solid state valve means. Load current to heat generation simulation network means responsive to the first electric signal is provided for deriving an output electric signal representative of the instantaneous power dissipation within the junction of said representative thyristor for a given value of load current flowing through said junction. Means is provided for applying this instantaneous power dissipation signal to the thermal analog model, and means is also provided for applying to the thermal analog model an additional input representative of ambient cooling fluid temperature. The output signal derived from the thermal analog model when so energized is representative of the junction temperature of the representative thyristor.

The aforesaid thermal analog model comprises a plurality of individual resistor-capacitor networks serially interconnected to form series sections of an RC ladder network having said power dissipation signal from the load current to heat generation simulation network means applied to one terminal thereof. The model further includes means for applying to another terminal of the ladder network the aforesaid additional input, which is an electric signal representative of the instantaneous temperature value of the cooling fluid flowing over the solid state valve and said heat sink system.

The serially interconnected resistor-capacitor networks that constitute the individual sections of the RC ladder network respectively comprise resistor and capacitor elements connected in parallel, and the values of the individual resistor and capacitor elements are determined from the expression $$R_{(t)} = R_1(1 - e^{-t/T_1}) + \ldots + R_N(1 - e^{-t/T_n})$$

where $R_{(t)}$ represents the transient thermal resistance per thyristor of the solid state valve means from the thyristor junction to the ambient fluid. $R_N$ represents the degrees centigrade change in temperature per watt of power dissipated in said thyristor and its magnitude is obtained by curve matching with the known thermal characteristics of any given thyristor to be modeled, $t$ is the instantaneous value of time following application of a step change in power dissipation, $T_n$ in seconds is the time constant of the respective resistor-capacitor networks constituting the individual sections of the RC ladder network forming said thermal analog model, and $e$ is the base of the natural logarithm.

The solid state valve thermal protection system further includes means for increasing automatically the magnitude of the power dissipation signal produced from the output from the current to heat generation simulation network means in accordance with increases in duty placed on a solid state valve means being monitored. Additionally, the valve thermal protection system includes output signal level sensing detector circuits responsive to the output from the solid state valve thermal analog model for comparing the output signal level to a plurality of different reference signal level values and deriving a plurality of different priority action output alarm signals in the event one or more of the reference signal level values is exceeded by the junction temperature output alarm signal derived from the output of the solid state valve thermal analog model. Preferably, there are a plurality of redundant identical channels constructed in the manner described above for each individual solid state valve means being monitored and at least two voting circuit means are provided which are responsive to the outputs from the level sensing circuit means of all of the channels for selecting at least two out of three channels whose response indicates an alarm condition was detected by their respective signal level sensing circuits, with the voting circuit means providing an output indication of an alarm condition only in the event that at least two out of three channels indicate such a condition exists. Finally, the valve thermal protection system further includes monitor means coupled to the solid state valve thermal analog model for monitoring the performance of the valve thermal protection system and for deriving output indications of at least the maximum value of the heat sink system cooling fluid ambient temperature, the difference between the maximum and minimum sensed values of heat sink system cooling fluid ambient temperature, the maximum value of the thyristor junction temperature, and the difference between the maximum and minimum sensed values of said thyristor junction temperature.

BRIEF DESCRIPTION OF DRAWINGS

These and other objects, features and many of the other attendant advantages of this invention will become better understood upon a reading of the following description when considered in conjunction with the accompanying drawings wherein like parts in each of the several Figures are identified by the same reference numeral, and wherein:

FIGS. 5A, 5B, and 5C are a series of characteristic curves showing, respectively, the valve of the load current, the heat dissipation and a representative solid state valve thyristor junction temperature versus time characteristic of an HVDC valve protected by the valve thermal protection system of the invention in the event of the occurence of a long bypass pair situation following steady state operation at 1.3 pu load;

FIG. 6 illustrates the temperature characteristics of an HVDC thyristor valve protected by the invention and illustrates the temperature excursion occurring during a worst case fault should the fault occur just prior to the trip off of transmission as illustrated in FIG. 5;

FIGS. 7, 7A, 7B, 7C and 7D comprise simplified sketches and a series of characteristic curves for use in deriving a typical solid state thyristor valve transient thermal impedance curve showing the dynamic changes in temperature of a solid state valve measured in degrees C per watt of input power (°C/W) plotted against time as the absicissa and explaining its use.

DETAILED DESCRIPTION OF PREFERRED EMBODIMENT

Figure 1:
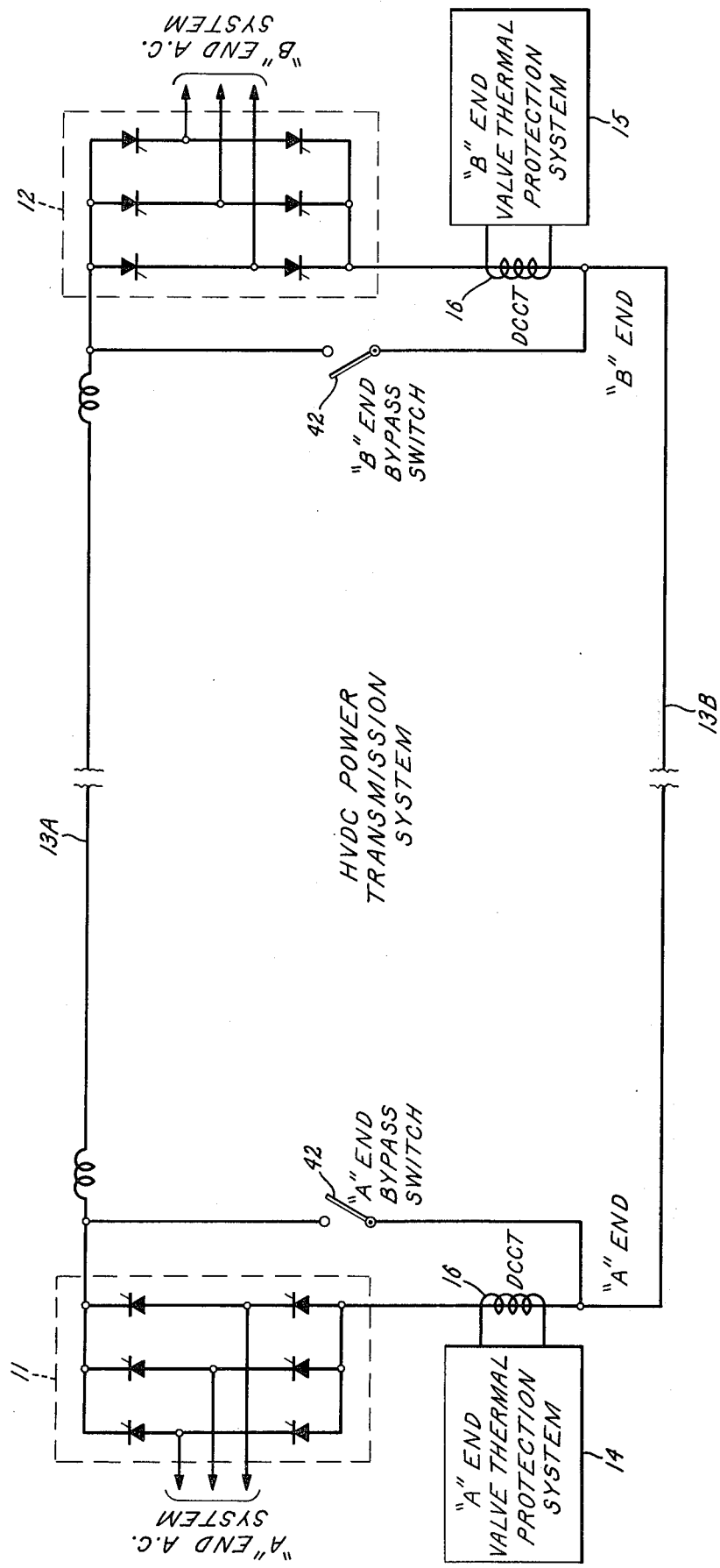
FIG. 1 is a schematic functional block diagram of a high voltage direct current (HVDC) power transmission system wherein solid state valve thermal protection systems according to the invention are employed to protect the solid state HVDC thyristor valves employed in the HVDC power transmission system.

FIG. 1 is a schematic functional block diagram of an HVDC power transmission system comprised by HVDC power converters 11 and 12 at each end of the system designated as "A" and "B" ends interconnected through direct current power conductors 13A and 13B. Each of the HVDC power converters is comprised by at least one group of six interconnected HVDC solid state semiconductor thyristor valves arranged in a three phase, double way, 6 valve bridge configuration having three separate AC terminals and a pair of DC terminals supplying (or supplied by) the DC power conductors 13A and 13B. The HVDC thyristor valve bridges 11 and 12 operate either as a rectifier or as an inverter, depending upon the direction of power flow, to supply high voltage direct current from the rectifier end over the HVDC link comprised by suitable choke inductors and direct current power conductors 13A, 13B to the inverter end. The HVDC thyristor bridge which is operated as the inverter, converts the high voltage direct current supplied over the HVDC link to alternating current for supply and distribution through its associated AC system. For a more detailed description of the construction and operation of HVDC power transmission systems, reference is made to the textbook entitled — "Direct Current Transmission" — volume 1 — Edward W. Kimbark, author - published by Wiley Interscience, a division of John Wiley & Sons, Inc. — New York, N.Y.

Figure 4:
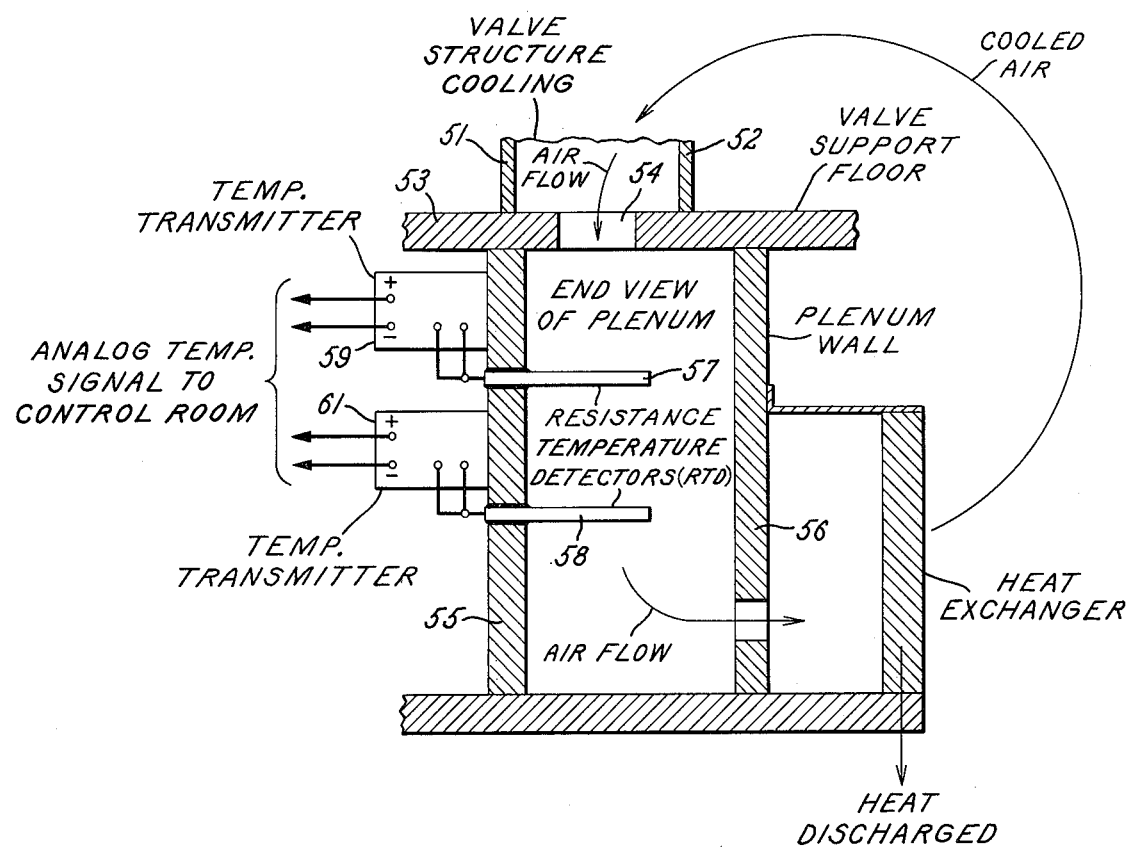
FIG. 4 is a schematic functional diagram showing a cross sectional view of a portion of an HVDV valve structure cooling air(fluid) heat sink system and the manner in which resistance temperature detectors are mounted in order to sense the temperature of the ambient heat sink system cooling air after passing over the HVDC valve structure cooling heat sink system.

It should be understood that while the HVDC power transmission system depicted in FIG. 1 employs six thyristor valve bridge power converters, any desired bridge configuration such as a twelve valve, eighteen valve, etc. bridge configuration could be employed, with each valve in itself comprising a large number of individual thyristors interconnected into a thyristor valve structure. U.S. Pat. No. 3,622,849 to Kelley discloses such an HVDC thyristor valve structure including a heat sink system for dissipating heat generated at the semiconductor junctions of the thyristors comprising the valve structure during operation. It is anticipated that similar HVDC thryistor valve structures will be employed in forming the HVDC thyristor power converters 11 and 12 depicted in FIG. 1 and that such valve structures will be mounted to a common cooling air plenum as depicted in FIG. 4 to be described more fully hereinafter. Such valve structures when assembled, whether comprising a six valve HVDC thyristor bridge, twelve valve HVDC thyristor bridge, or any other number of individual valves including if desired only a single valve, all are encompassed by the term "valve means" or "valve structure" as used hereafter since such a "valve means" or "valve structure" would in any event include some form of heat sink system past which ambient cooling fluid flows to provide dynamic cooling for the thyristor or thyristors of the valve means during operation.

Figure 8:
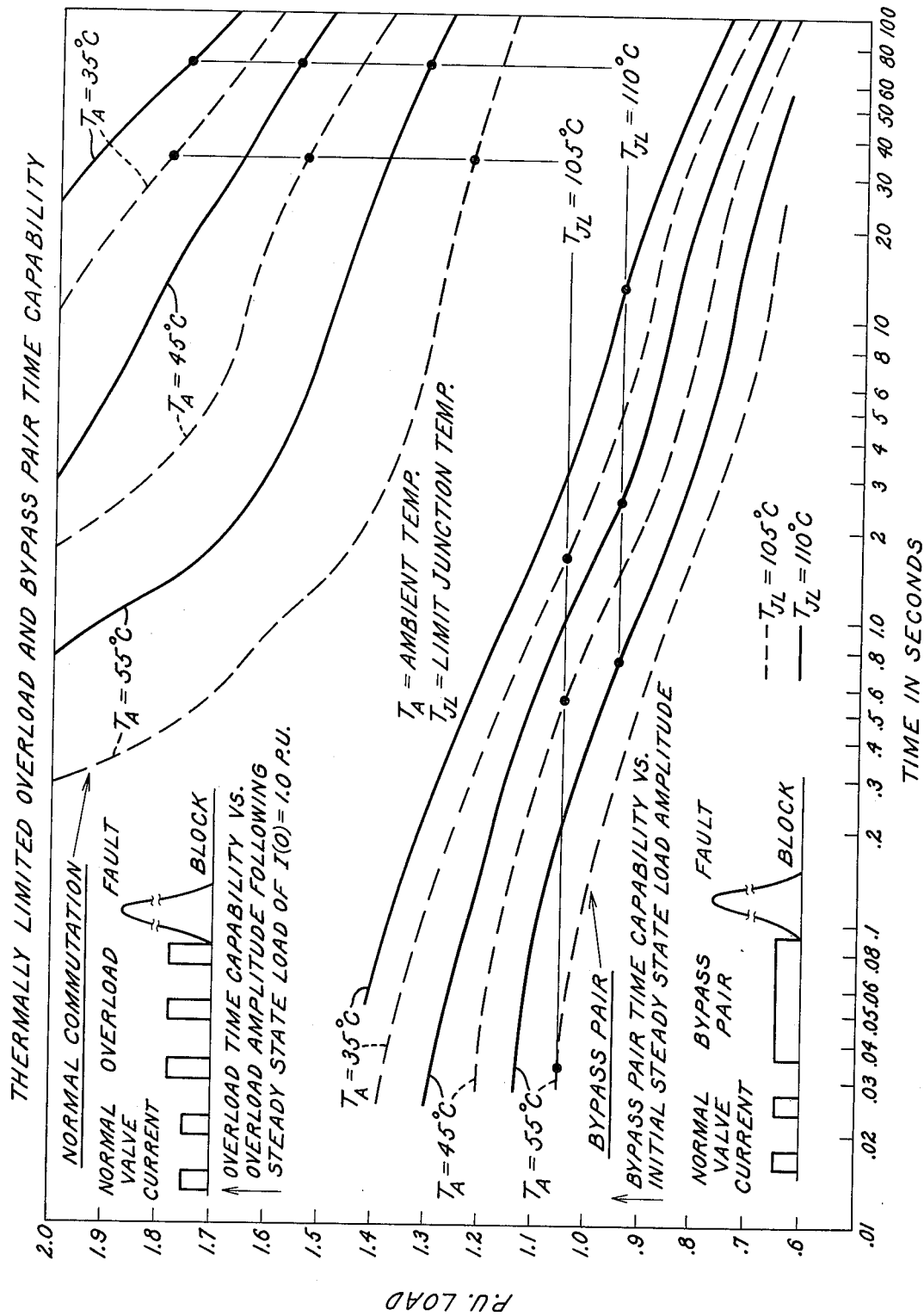
FIG. 8 is a series of curves which illustrate the normally available thermally limited, step applied overload time capability of solid state thyristor valves following steady state operation at 1.0 pu load and the bypass time capability following various levels of initial steady state load, both of which characteristics can be taken advantage of with HVDC systems protected by the invention.

From the above discussion, it is believed evident that the need to provide adequate heat dissipation from the heat sinks of solid state thyristors in order to maintain the thermally sensitive junction of the semiconductor layers of the thyristor within prescribed temperature ranges, has long been recognized. For a discussion of this need, reference is made to the textbook — "Semiconductor Controlled Rectifiers" by F. D. Gentry, F. W. Gutzwiler, Nick Holonyak, Jr. and E. E. Von Zastrow published by Prentice-Hall, Inc. Englewood Cliffs, New Jersey, 1964 — Library of Congress Catalog Card No. 64—21172. It has long been the practice to design solid state thyristor valve control and power conversion systems in such a manner that the peak load which the control or power conversion system will be required to handle never exceeds certain established values which are proportioned to maintain the thermal response of the individual thyristors within the manufacturer's prescribed temperature ranges. However, it has long been known that solid state semiconductors possess momentary overload capabilities considerably in excess of their steady state ratings dependent upon the prior conduction history of the device, its ambient operating temperature, etc. FIG. 8 of the drawings illustrates this inherent capability of solid state thyristor valves of standard design.

In HVDC power transmission systems of the type depicted in FIG. 1, AC system disturbances can occur at either end of the HVDC power transmission link which effectively could be stabilized if the HVDC link could be instantaneously employed in the stabilization process. To accomplish this, however, it is desirable that the HVDC solid state valve means comprising the converters 11 and 12 sustain momentary overloads which are considerably in excess of their steady state ratings and still maintain the cost of the system at a level which is not prohibitive. In order to take advantage of the momentary overload capability of the HVDC solid state valve means, however, it is absolutely essential that some valve thermal protection means be provided to keep track of the instantaneous temperature in order to limit the duration and/or amplitude of an overload when the thyristor junction temperatures approach the design limits for maintaining the suppression capability of the solid state valve means.

The present invention makes available such a valve thermal protection means, shown at 14 and 15 in FIG. 1, which are mounted at each end of the system for the purpose of monitoring the solid state thyristor instantaneous junction temperatures and signalling the existence of an alarm condition in the event that either a deliberate or unintentional overload condition raises the junction temperatures to a level which would jeopardize the suppression capabilities of the valves. For this purpose, each valve thermal protection system includes a direct current-current transducer 16 for sensing the magnitude of the load current flowing through the respective thyristor solid state bridge valve means 11 or 12 and for supplying the valve thermal protection systems 14 or 15 current signals representative of the magnitude of the load current through the respective solid state valve means to be protected. While current transducers 16 have been employed in the embodiment of the invention shown in FIG. 1, it is believed obvious to those skilled in the art that other forms of detecting and signalling the magnitude of the load current flowing through the solid state valve means 11 and 12 could be employed such as shunts, Hall effect detectors, or the like.

Figure 2:
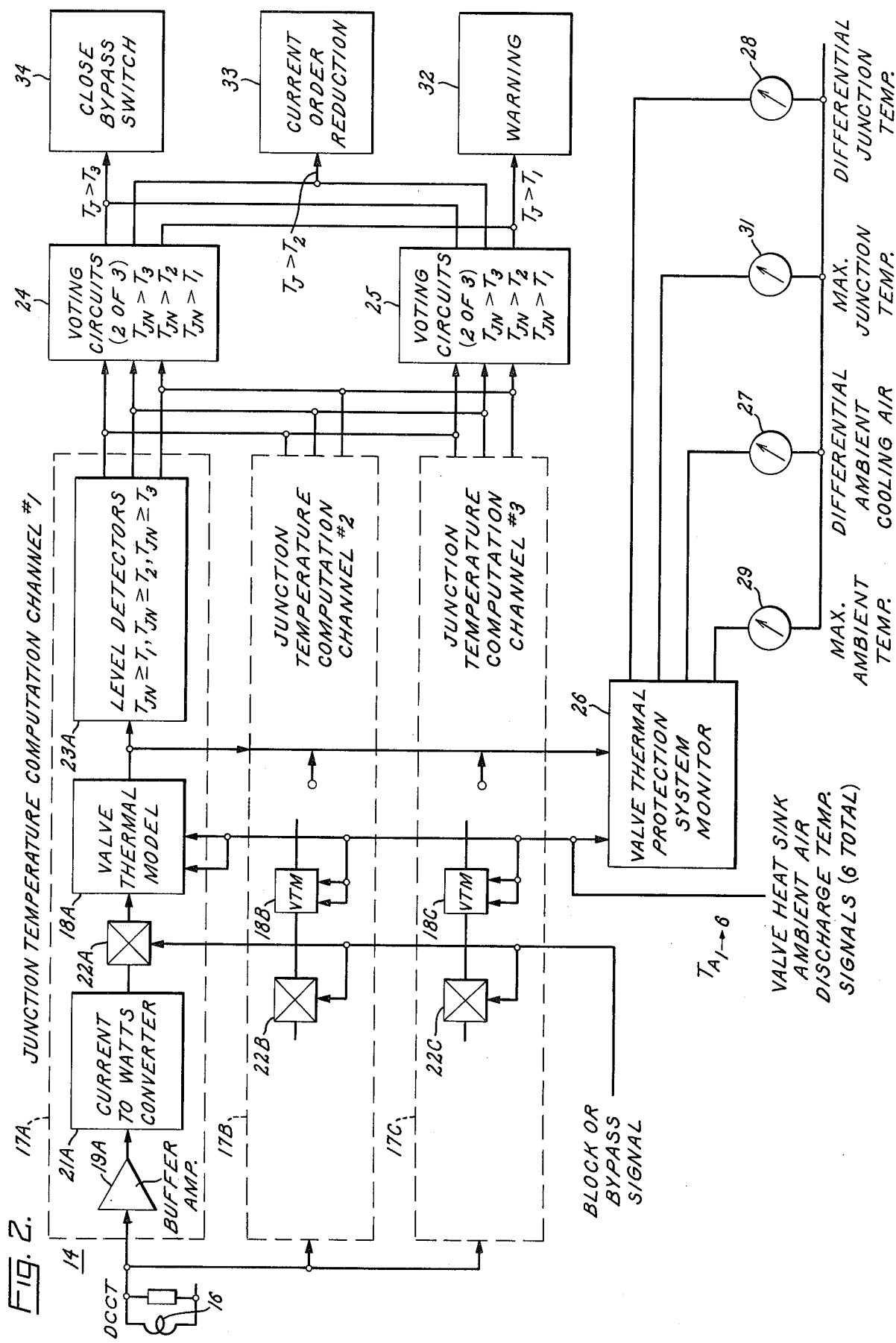
FIG. 2 is a functional block diagram showing the details of construction of a solid state valve thermal protection system according to the invention and which is designed especially for use with HVDC solid state thyristor valves employed in the power converters of an HVDC power transmission system as depicted in FIG. 1.

FIG. 2 is a functional block diagram of the construction of the valve thermal protection system. As depicted in FIG. 2, each valve thermal protection system such as 14 is comprised by three redundant identical junction temperature computation channels 17A, 17B and 17C. The input current signal derived from the current transducer 16 and representative of the load current through the valve means being protected, is applied in parallel to the inputs of all three junction temperature computation channels 17A, 17B and 17C. Since each junction temperature computation channel is identical in construction and operation, only channel 17A will be described.

The heart of each junction temperature computation channel is the valve thermal analog model circuit shown at 18A, etc. This is in effect an analog computer which is supplied with input signals representative of the load on the valves being protected, the valve ambient temperature and a signal indicating the presence of a bypass pair or other increased duty condition. The valve thermal analog model circuitry converts these input signals into an output signal which is continuously analogous to the junction temperature of a repesentative thyristor in the valve means. The input signal representative of the load on the valves is derived from current transducer 16 and supplied through a buffer amplifier 19A, a current to watts converter 21A and a switching circuit 22A to the input of the valve thermal model 18A. The switching circuit 22A operates to apply to the valve thermal model a valve bypass pair condition or other signal indicating that the duty on the valves being protected has been increased such as by substantially tripling their period of conductivity, which occurs during a blocked or valve bypass pair condition, as opposed to the one-third period of conduction during normal operation conditions. In addition, the valve thermal model 18A is supplied with signals representative of the valve heat sink system cooling fluid ambient temperature.

In a preferred form of the invention, we provide two cooling fluid temperature sensors for the cooling fluid flowing through each insulating housing containing valves, but the invention in its broader aspects is not so limited. Various valve structure configurations, such as twin valve or quadri-valve structures, could have different arrangements of cooling fluid temperature sensors. In the illustrated embodiment, suitable voting circuitry selects that cooling fluid temperature signal of the two supplied to a given channel 17A, 17B or 17C which represents the highest sensed cooling fluid temperature.

The valve thermal analog model 18A develops at its output a signal analogous to instantaneous junction temperature of a representative thyristor in the valve, which signal is supplied to a number of signal level detectors 23A. The signal level detectors 23A provide three independent temperature reference levels which, if exceeded, indicate that the predicted thyristor junction temperature is in excess of a certain first adjustable level (say 100° C), a second level (say 105° C) or a third level (say 110° C). The outputs from the signal level detecting circuits 23A, 23B, 23C are supplied to the respective inputs of a set of two voting circuits 24 and 25. Voting circuits 24 and 25 supply at their output three different types of voted warning signals representing an early warning on indicator 32 if the predicted valve junction temperature exceeds the 100° C level, a load level reduction order signal at terminal 33 if the predicted junction temperature exceeds the 105° C level, and an emergency stop with bypass switch closure alarm signal at terminal 34 if the predicted junction temperature exceeds the 110° C level. These warning signals are produced only if at least two of the three independent junction temperature computation channels agree that such action associated with any of the three levels mentioned above, is required. The use of the redundant identical junction temperature computation channels in conjunction with the voting circuits reduces to a negligible probability the likelihood of a false trip signal being generated or conversely a failure of a trip signal to be generated when the actual situation occurring in the valves being protected requires that action be taken.

In addition to the above, a valve thermal protection system monitor shown at 26 is provided which warns the operator of potential failures within the valve thermal protection system itself. For this purpose, the valve thermal protection system monitor 26 monitors the difference between the highest and lowest signals from all of the heat sink system ambient cooling air temperature sensor circuits and an alarm is signalled if the difference between any of these signals exceeds a certain adjustable value (say 5° C). The difference between the highest and lowest predicted thyristor junction temperatures in the three independent junction temperature computation channels also is continuously monitored and an alarm provided if this difference exceeds a certain level (say 5° C). Additionally, the monitor provides an output indicative of the maximum sensed value of heat sink system cooling air ambient temperature and the maximum thyristor junction temperature predicted value. The monitoring system can provide buffered analog signals to alarm circuits or recording instruments and/or suitable regulating and control signal circuitry if automatic response is desired. In addition, an unvoted alarm signal is provided to the station alarm system through the valve thermal protection system monitor if any level detecting circuit in the level detectors 23A, 23B, 23C of the junction temperature computation channels is in the tripped state which could indicate presence of an iminent warning or a defective channel. Hysteresis is provided such that once tripped, a level detector will not be automatically reset until the temperature signal reduces below the set point by an adjustable differential of say 2° C.

As stated above, the heart of each junction temperature computation channel is the valve thermal analog model 18, which is designed to be dynamically electrically analogous to the known instantaneous thermal characteristics of the valve means being monitored for a given value of instantaneous D.C. load current supplied through said valve means. These thermal characteristics include the heat transfer to cooling fluid capability characteristics of a representative thyristor (including its heat sink) in the valve means. These characteristics of a representative thyristor are determined experimentally and analytically in a manner similar to that shown in FIGS. 7 of the drawings wherein a solid state thyristor 10, 9 is provided, with its heat sink 9 incorporated in an identical manner to that present in the final installation of such thyristors in an HVDC thyristor valve bridge structure such as 11 or 12 or other similar arrangements. Standard conditions of cooling fluid flow are established in conformance with the manufacturer's specifications and which will be encountered in a final installation as indicated in FIG. 7. With such a test arrangement, volts versus time for a constant current can be taken, from which a curve of instantaneous watts versus time can be plotted as shown in FIG. 7A of the drawings. Next, data is obtained from the temperature rise accompanying dissipation of a constant number of watts for successively increased time periods varying from a few microseconds to several thousand seconds. In each period, the test is begun with the thyristor junction at room temperature. At the conclusion of the test interval, the junction temperature is measured immediately by observing the voltage drop resulting from passing a test current of 10 amps through the thyristor. The voltage drop at 10 amps versus temperature characteristic of the thyristor previously will have been calibrated by the manufacturer so that the junction temperature can then be determined. The worst case rise in junction temperature which accompanies constant dissipation with increasing time cycle can then be plotted in the manner shown in FIG. 7B of the drawings. By dividing temperature rise by watts dissipated and plotting the quotient as shown in FIG. 7C, a transient thermal impedance curve can be derived which is plotted with the log of time as the abscissa. This transient thermal impedance curve then applies for a given thyristor assembly for both heating and cooling over a wide range of dissipations. The valve thermal model really models one thyristor (including its heat sink system), but it is scaled to be representative of the statistically typical maximum thermal impedance of the total population of thyristors in the bridge or bridges. A cooling excursion can be determined by superimposing the temperature fall resulting from a negative going dissipation and a continuation to steady state of whatever previous dissipation existed. This process is known as superposition and provides results which can be verified experimentally.

The transient thermal impedance response data having the form shown in FIG. 7C conveniently can be broken up into a number of constituent first order system responses. Equation (1) shows seven first order systems whose summation response to a step input of power is a suitable approximation for the junction to cooling fluid heat transfer characteristic response to a step increase in watts through a given solid state thyristor semiconductor valve whose actual junction to heat sink cooling system characteristic was experimentally and analytically determined in the above-described manner.

$$R_{(t)} = R_1(1 - e^{-t/T_1}) + \ldots + R_n(1 - e^{-t/T_n}) \tag{1}$$

In equation (1) $R_{(t)}$ represents the transient thermal resistance per thyristor of the solid state semiconductor thyristor valve. $R_n$ represents the degrees centigrade change in temperature per watt of power dissipated in said thyristor and its magnitude is obtained by curve matching with the known thermal characteristics of a given solid state thyristor assembly as determined in the above-described manner. $t$ is the instantaneous value of time, $e$ is the base of the natural logarithm, and $T_n$ seconds is the time constant of the resistor-capacitor networks constituting the series connected sections of an RC ladder network $R_1$-$C_1$, $R_2$-$C_2$, etc., shown generally at 18 in FIG. 3 of the drawings. In each resistor-capacitor network, the resistor element is connected in parallel with the capacitor element.

A suitable approximation of the solid state thyristor junction to cooling fluid heat transfer characteristic defined by equation (1) can be composed with seven first order systems comprised by simple parallel-connected resistor-capacitor networks serially interconnected to form an RC ladder network through appropriate scaling in conformance with a suitable transfer function such as that shown in equation (2). When extrapolating a single thyristor's transient thermal response to multi-thyristor valve structures or bridges, suitable allowance must be made for variations in the thermal characteristics of the total thyristor population of a valve or bridge.

$$V_{tj} = \frac{T_J + 25° \text{ C}}{\frac{10° \text{ C}}{V}} \tag{2}$$

In equation (2) $V_{tj}$ is the output junction temperature alarm signal obtained from the valve thermal analog model and is representative of the junction temperature of a representative thyristor in the valve means, as affected by heat dissipation by the thyristor through its heat sink system. $T_J$ is the junction temperature of the thyristor as derived from application to the thermal analog model 18 of the output current of the non-linear current to watts heat generation simulation network 21 (FIG. 3) and 10° per volt is a scaling factor for the number of degrees C temperature rise or fall represented by each volt of the output signal $V_{tj}$.

Figure 3:
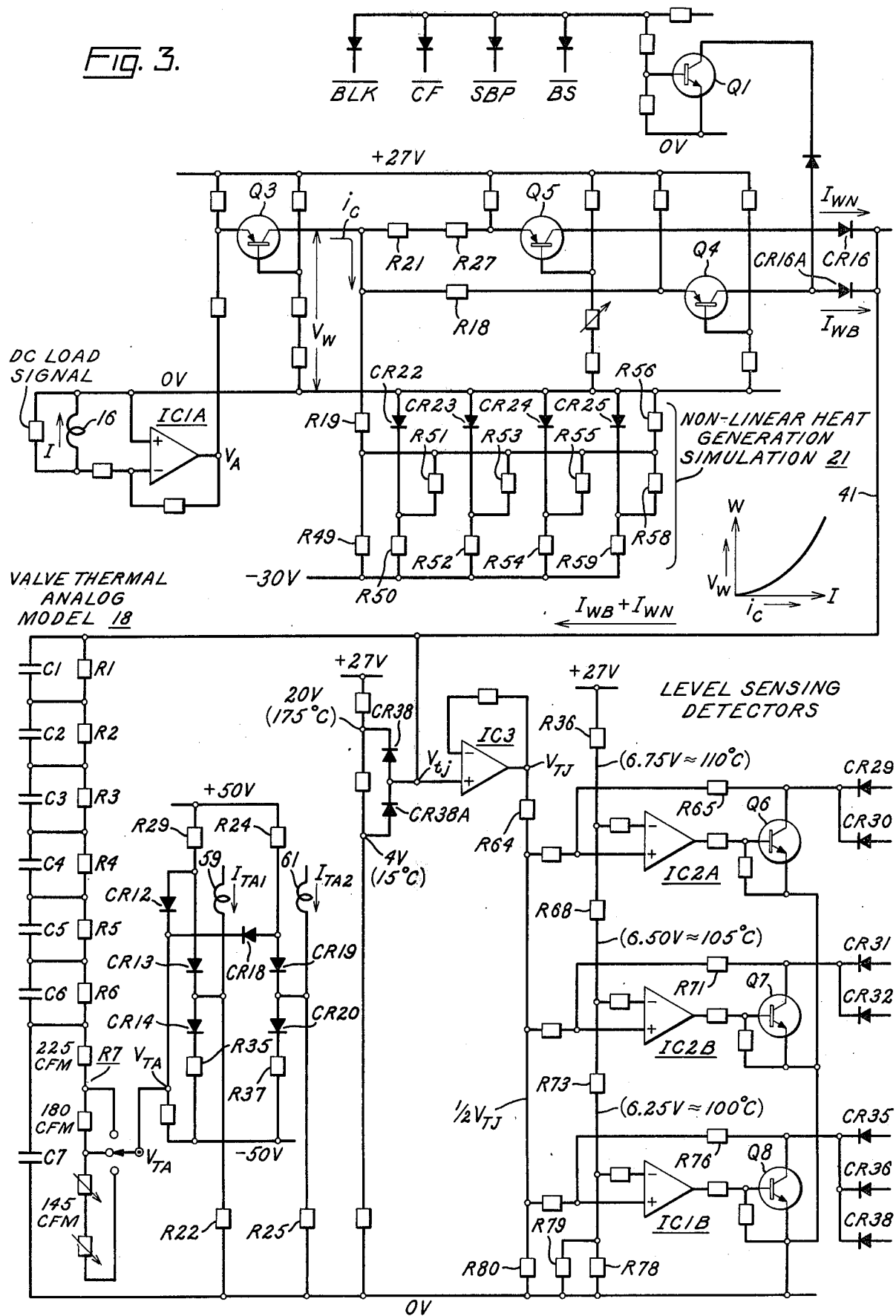
FIG. 3 is a schematic circuit diagram illustrating the construction of essential novel parts of the valve thermal protection system shown in block diagram in FIG. 2.

Through the use of appropriate scaling as exemplified by transfer function (2), it is possible, in the embodiment of FIG. 3, to construct a valve analog model with seven, serially connected, simple resistor-capacitor networks that comprise the individual sections, connected in series, of an RC ladder network as shown at 18 in FIG. 3. The thermal analog model thus designed can be readily trimmed to compensate for valve dissipation which is not load dependent, such as switching losses, snubber energy absorption, voltage losses and the like, and to compensate for dependence of thermal impedance on the quantity of flow of valve cooling fluid and heat sink design through appropriate adjustment of the resistance and capacitance values of the parallel connected elements of the seventh stage resistor-capacitor network $R_7$-$C_7$. For example, in FIG. 3 the potentiometer associated with $R_7$ is set so that thermal analog model 18 simulates a representative thyristor in valve means through which 180 cubic feet per minute (CFM) of air coolant flow is passing. Rotating the pointer of the potentiometer clockwise one step would reduce $R_7$ and set the model to simulate increased air flow (e.g., 225 CFM), and rotating it counterclockwise one step would increase $R_7$ and set the model to simulate decreased air flow (e.g., 145 CFM).

FIG. 3 is a detailed schematic circuit diagram showing the essential features of construction of each of the junction temperature computation channels 17A, 17B and 17C of FIG. 2. In FIG. 3, the direct current load sensing current transducer 16 supplies its output to the inverting input terminal of a buffer operational amplifier 1C1A. Amplifier 1C1A derives at its output a buffered positive going voltage signal $V_A$ which is proportional to the instantaneous DC load current flowing through the solid state semiconductor HVDC valve means comprised by the rectifier bridge 11 of FIG. 2, for example. The buffered voltage $V_A$ is supplied to a controlled current source comprised by the transistor Q3 whose collector current $i_c$ is proportional to the instantaneous voltage value $V_A$ which as noted above is proportional to the instantaneous DC load current flowing through the solid state valve means being monitored.

Current $i_c$ is introduced into a non-linear, resistor-diode, heat generation simulation network that constitutes the current to watts converter 21A, etc. shown in FIG. 2 and which is comprised of resistor R19, diodes CR22, CR23, CR24, CR25 and resistors R49-R59. Scaling of this network is as shown on the curve to the right of the network in FIG. 3 such that the voltage $V_W$ developed across the heat generation simulation network (i.e., current $i_c$ times the impedance of the simulation network) is proportional to instantaneous thyristor power dissipation.

The voltage $V_W$ appearing across the non-linear heat generation simulation network 21 is applied through resistors R21 and R27 to the emitter of a PNP transistor Q5 and also through resistor R18 to the emitter of a PNP transistor Q4. Transistors Q5 and Q4 operate as controlled current sources whose collector currents $I_{WN}$, $I_{WB}$ each are proportional to instantaneous thyristor power dissipation. The first signal current $I_{WN}$ is proportional to the normal thyristor power dissipation averaged over a full cycle while the valve is conducting only during about one-third of the cycle. The second signal current $I_{WB}$ produces twice as much signal current as $I_{WN}$ to simulate the additional average dissipation which results from continuous conduction on the part of a thyristor when it is part of a valve which is one of a pair of valves operating in a blocked or bypass condition and the valve is carrying current continuously. The circuit operation is designed such that normally only the current signal $I_{WN}$ is introduced over conductor 41 to the valve thermal analog model circuit 18 whose construction was described above. During such normal operation, the current signal $I_{WB}$ is shunted to ground through the NPN transistor Q1 which is in a normally conducting condition. However, upon the occurrence of any one of a number of conditions such as commutation failure $(\overline{CF})$, block $(\overline{BLK})$ and valve bypass pair formation $(\overline{SBP}$ or $\overline{BS})$, the base of transistor Q1, which normally is maintained positive, is driven toward zero by the occurrence of a negative going signal at $\overline{BLK}$, $\overline{CF}$, $\overline{SBP}$, or $\overline{BS}$ indicating one of these conditions and causes Q1 to become blocking. Upon this occurrence, the signal current $I_{WB}$ will be introduced into the conductor 41 along with $I_{WN}$ and is so proportioned that when added to $I_{WB}$, the total current $I_{WB} + I_{WN}$ represents watts loss due to continuous conduction through the valve being monitored as opposed to watts loss during the one-third conduction period of each operation cycle represented by the normal $I_{WN}$ signal current. Thus, it will be seen that the non-linear heat generation simulation network 21 normally delivers to the valve thermal analog model 18 a current signal $I_{WN}$ proportional to thyristor instantaneous dissipation. However, upon the occurrence of a signal indicating commutation failure $(\overline{CF})$, a signal indicating a block $(\overline{BLK})$, or a valve bypass pair operating condition $(\overline{SBP})$ or $(\overline{BS})$, one complimentary set of valves will conduct continuously rather than for only one-third of a normal power system cycle. This results in a tripling of average dissipation in the one pair of valves. Hence, while the non-linear heat generation simulation network normally delivers the current signal $I_{WN}$ analogous to average watts dissipation in any thyristor during normal operating conditions, when the bypass conditions occur, the signal automatically is tripled by the addition of $I_{WB}$ to account for additional heating in the continuously conducting bypass valve pair.

It should be noted that the input signal to the current to watts transducer comprised by non-linear heat generation simulation network 21, is derived from a direct current-current transducer which is in series with the DC side of the HVDC valves as shown in FIG. 1. Consequently, the direct current transducer continues to monitor valve current while the solid state valves are blocked or in the bypass pair mode, whereas an alternating current-current transformer on the AC side of the valves would not. Thus, during a bypassing pair operation, current through a bypass pair of valves continues to be monitored since the current in the valves as well as the direct current-current transducer signal goes to zero only after the valves are blocked, bypassed and the bypass switch shown at 42 in FIG. 1 is closed.

As stated earlier with respect to FIG. 2, there are two valve heat sink ambient cooling air temperature signals supplied to each valve thermal model in each junction temperature computation channel. In this particular embodiment, there are three separate valve structures through which cooling air passes in three separate paths. The two coolant temperature signals supplied to a given one of the three computation channels 17A, 17B, or 17C are derived from a single one of these paths, with each pair of such signals being derived from a different path. These numbers of course can be varied to accommodate the needs of a particular installation employing 12 valve bridges, 18 valve bridges, twin valves, quadri-valves, etc. Normally, in an HVDC bridge configuration such as shown at 11 and 12 in FIG. 1, the valve structures may be mounted and connected to operate together as bypass valve pairs. In one specific embodiment, the valves constituting one bypass valve pair are provided with a common cooling air plenum such as shown in FIG. 4 of the drawings wherein heat sink cooling air after passing over the valve structure cooling fins is forced between valve structure support legs such as shown at 51 and 52 in FIG. 4 which in turn are supported by a valve structure support floor 53. The cooling air passes through an opening 54 in the valve structure support floor thence down into a plenum chamber formed by a pair of plenum walls 55 and 56 and then out through an opening in the plenum wall 56. Two separate semiconductor resistance temperature detectors 57 and 58 of conventional, commercially available construction are supported within the cooling air plenum defined by the plenum walls 55 and 56 and are supported by the plenum wall 55. By this construction, the cooling air after passing over the valve structure cooling fins which comprise the main part of the heat sink system of the HVDC valve structures, is forced out past the resistance temperature detectors 57 and 58 before being exhausted to atmosphere or recirculated after suitable cooling. The resistance temperature detectors 57 and 58 derive electric output signals $i_{TA1}$ and $i_{TA2}$ which are supplied through suitable amplifying circuits indicated at 59 and 61 for supply to the valve thermal analog model 18. Of course, other arrangements and combinations are possible.

As shown in FIG. 3 of the drawings, the temperature transmitters 59 and 61 derive respective ambient cooling air temperature signals $I_{TA1}$, $I_{TA2}$ that are supplied as two inputs to a diode-resistor logic network comprised by resistors R29, R22, R24, R25, and R37 and diodes CR12, CR13, CR14, CR18, CR19 and CR20. The diode-resistor logic network operates to select that signal which represents the highest cooling fluid ambient temperature and derives from that signal an output voltage $V_{TA}$ representative of the higher of the two sensed temperatures for application to the valve thermal analog model 18. As shown in FIG. 3, $V_{TA}$ is applied as a second input signal to the last stage, parallel connected resistor-capacitor network $C_7 - R_7$ of the valve thermal analog model to thereby represent the ambient temperature to which heat is being discharged by the solid state valve means.

A predicted solid state thyristor junction temperature voltage signal $V_{tj}$ is derived across the valve thermal analog model 18 and is determined by adding to the voltage representing cooling fluid ambient temperature $T_A$ a voltage representing the temperature rise due to power dissipation in the solid state valve means ($T_{RISE}$). Thus $T_J = T_A + T_{RISE}$. As stated earlier, in the present invention the physical parameters of temperature are modeled by their electrical analog voltage and hence the preceding expression for the thyristor junction temperature can be restated in the form $$V_{tj} = V_{TA} + (I_{WN} \times Z)$$

where Z is the electrical analog of the thermal impedance of the solid state thyristor means. As depicted in the simplified sketch of FIG. 7D of the drawings, the resultant output signal $V_{tj}$ indicative of the instantaneous predicted thyristor junction temperature, is derived by multiplying the current $I_{WN}$ (or alternatively $I_{WN} + I_{WB}$) by the thermal impedance factor Z and adding the product to the cooling fluid ambient temperature signal $V_{TA}$. Signal $V_{tj}$ is supplied as an input to a buffer operational amplifier IC3. Buffer op-amp IC3 acts as a buffering voltage follower in such a way that its output voltage $V_{TJ}$ is equal to the voltage $V_{tj}$ appearing across the valve thermal analog model 18 but due to the buffering action of IC3, loads on the output of IC3 do not influence the behavior of the valve thermal analog model. Diodes CR38A and CR38 connected to the non-inverting input of op-amp IC3 constrain the range of the input voltage to the op-amp so that it lies within voltage ranges corresponding to 15° and 170° C, for example, thereby maintaining the buffer op-amp IC3 within acceptable common mode limits and avoiding amplifier latch-up.

Resistors R64 and R80 connected to the output of buffer op-amp IC3 divide the voltage $V_{TJ}$ to a value ½ $V_{TJ}$. The value ½ $V_{TJ}$ is compared to three reference voltage levels, for example 6.25 6.50 and 6.75 volts, which by design are calculated to correspond to junction temperatures of 100°, 105° C and 110° C, respectively. The ½ $V_{TJ}$ voltage then is compared to each of these reference signal voltage levels in respective level sensing detector comparator amplifiers IC2A, IC2B and IC1B, respectively. The output from the comparator amplifiers is supplied to transistor switches comprised by the transistors Q6, Q7 and Q8, respectively, whose outputs in turn are supplied through the coupling diodes CR29-CR30, CR31-CR32, CR35-CR36 and CR37-CR38, respectively, to the voting circuits 24 and 25. The resistor-divider network R36, R68, R73, R78 and R79 establish the reference signal voltage levels of 6.25, 6.50 and 6.75 volts as inputs into the level comparator op-amps IC2A, IC2B and IC1B, respectively. Resistor R78 can be used to trim simultaneously all three levels up or down. Each level detecting stage comprised by comparator op-amps IC1B, IC2B and IC2A, respectively, is provided with hysteresis by the resistors R76, R71 and R65, respectively, which adjust the circuit in a manner such that once a particular level has been exceeded by the calculated junction temperature signal $V_{TJ}$, the signal thereafter must reduce below the set point by a fixed amount determined by the setting of the above-named resistors before the level detector automatically is reset.

The output alarm signals derived from the transistors Q6, Q7 and Q8 are supplied through the respective coupling diodes CR29, CR30, etc. to the inputs of each of the voting circuits 24 and 25 shown schematically in FIG. 2 of the drawings. The function of the voting circuits 24 and 25 is to provide a voted alarm, emergency or trip signals which then are supplied to an operator or operators of the HVDC system in the form of a warning as shown at 32 if the calculated junction temperature exceeds the 100° C level, as a current order reduction signal as shown at 33 if the calculated junction temperature exceeds the 105° C level and as a close bypass switch signal as shown at 34 if the calculated junction temperature exceeds the 110° C level, respectively. The voting circuits 24 and 25 each are comprised of conventional diode-transistor logic circuits for comparing the three level detector stage outputs of all the valve junction temperature computation channels and to provide the voted alarm, emergency or trip signals identified above when the input signals from the level detecting circuits are present from at least two of the three valve junction temperature computation channels.

The valve thermal protection system also is provided with an internal monitor shown at 26 in FIG. 2 which warns the operator of the HVDC power transmission system of any failures which might occur within the valve thermal protection system itself. For this purpose, using well-known diode-transistor logic circuitry, the difference between the highest and lowest value heat sink ambient cooling air temperature signal from the six ambient temperature resistance temperature detectors such as 57 and 58 in FIG. 4 are continuously monitored and an alarm is given if the difference between the highest and lowest signal exceeds a preset value, say 5° C. The difference between the highest and lowest computed junction temperature in the three independent valve junction temperature computation channels also is continuously monitored and an alarm condition indicated if this difference exceeds say 5° C. The monitor 26 also provides analog output signals to alarm circuits or recording instruments indicative of the highest value heat sink ambient cooling air temperature sensed and the highest predicted junction temperature in addition to the differential ambient temperature and differential computed junction temperature and these are displayed by the indicating instruments 27-31.

As shown in FIG. 1 of the drawings, there are essentially identical valve thermal protection circuits provided at each terminal of an HVDC power transmission system. During operation, generally only one terminal will be in thermal difficulty at any time depending mostly on the ambient temperature and the incidence of bypass valve pair conditions which the HVDC power transmission system has sustained. When either thermal protection system detects a voted first level threshold condition, a warning is signalled at the local terminal directly by means of the warning indicator 32 shown in FIG. 2 and via a slow communication link to the opposite end terminal. Upon this occurrence, the operators normally eliminate the cause by reducing steady state current order or increasing valve cooling effect or all in order to correct for the condition. If the predicted valve junction temperature then continued to increase in spite of the above action, and if the second level warning is reached, then the strategy is to reduce current order automatically to some predetermined level. This level presently is expected to be about 1.10 per unit but the manner in which this is done is critical to maintenance of current margin at the inverter which in turn is necessary to avoid unintentional power reversal or rundown of the DC system. The current order reduction normally involves the use of communication between the two terminals of the HVDC power transmission system link and is well known in the HVDC art. In summary, it can be said that no matter on which end the over-temperature condition occurs, it is necessary to reduce current order limit first on the inverter terminal. When the over-temperature condition disappears, it thereafter is necessary to increase the order limit first on the terminal which is the rectifier. In some cases it may be desirable to prevent automatic increase of load after an over-temperature incident until the operator has reset the trip manually and/or manually reduced the order. He then would have an option to avoid a power bump. If the predicted valve junction temperature thereafter continues to rise despite the ordered load reduction, and the third level warning is produced by indicator 34, then a bypass switch such as 42 is closed and power transmission is stopped automatically. Such a condition might occur, for example, if the communications link was defective and an automatic load reduction procedure did not take place when ordered.

FIGS. 5A, 5B and 5C illustrate typical behavior of the valve thermal protection system in the event of valve junction overheating. The characteristic curve shown in FIGS. 5A-5C assume initial steady state load conditions of 1.3 pu load and initial junction temperature of around 96° C. At time $t = 0$, the system goes into an assumed extended bypass pair condition with a resulting tripling of the dissipation in the bypassed pair of solid state valves as shown in FIG. 5B. The actual junction temperature of the thyristors as simulated by the valve thermal protection system increases as shown in FIG. 5C. When the simulated temperature reaches the 100° C reference level, an alarm automatically is provided by the warning indicator 32 of FIG. 2. At this point some automatic load reduction may be attempted as described above. When the temperature reaches 105° C a coordinated order limit reduction procedure is initiated. As explained above, this procedure involves communication between the two terminals of the HVDC power transmission system link and must be performed first on the inverter terminal to avoid the possibility of unwanted power reversal. It is assumed that the communication procedure will require about 50 milliseconds. If the bypass pair condition remains, but the current order is successfully reduced, then there is a momentary reduction in junction temperature followed by a later increase which eventually may attain the 110° C level where a trip signal is produced by indicator 34 that automatically initiates valve block and bypass and closure of the bypass switch and a permanent bridge stop. If, on the other hand, the bypass pair condition continues but a current order reduction is not achieved, then the junction temperature as well as the predicted junction temperature by the valve thermal analog model soon will reach 110° C level at which time a block and bypass command and a bypass switch closure command is initiated. Thirty milliseconds later, the bypass switch actually closes and current is shunted from the valves.

FIG. 6 illustrates what happens to the junction temperature assuming a worse case fault occurs when the junction temperature is at 110° C just prior to closing the bypass switch. As illustrated in FIG. 6, the junction temperature will reach a level of about 200° C but will have the opportunity to cool to about 150° C before forward voltage is again reapplied to the thyristor valve after gate blocking. Since each thyristor valve used in the system previously has been tested for its ability to regain its turn-off or blocking (suppression) capability at 150° C, safe system operation is assured without permanent damage to the valves.

Because of the redundance and built-in internal monitoring, the reliability of the valve thermal protection system is quite high. Note that there are two separate resistance temperature detectors and associated temperature transmitters for each temperature computation channel in addition to the fact that there are three separate temperature computation channels. With this arrangement the higher indicated ambient cooling air temperature always is selected so that either detector could fail "low" without disturbing the channel's ability to function. A failure of the resistance temperature detector "high" would not induce voted trip signals from the remainder of the channels as is apparent from the foregoing description. Hence, a false output alarm trip is avoided since two of the three redundant identical channels are not present as inputs to the alarm circuitry. This prevents the generation of an inappropriate alarm trip signal. However, should one other channel indicate the presence of over-temperature conditions, then alarm output trip signals will be produced. In addition, the valve thermal protection system internal monitor continuously provides the operator of the system with an output indication of the maximum heat sink ambient cooling air temperature, the difference between the maximum and minimum values of sensed ambient cooling air temperature, the maximum predicted solid state thyristor junction temperature and the difference between maximum and minimum values of predicted thyristor junction temperature whereby continuous observation of proper functioning of the valve thermal protection system is made possible. With these built-in safeguards, calculated probability of failure of the system is reduced to a very low value of the order of .00099 failures a year based on a 1 year maintenance interval.

From the foregoing description, it will be appreciated that the present invention provides a new and improved solid state valve thermal protection system that is particularly useful in the protection of the solid state semiconductor thyristor valves of HVDC power converters used in high voltage direct current power transmission systems. Because of its design, the valve thermal protection system allows the solid state valves to be utilized in a manner such that they may be safely called upon to sustain momentary overloads considerably in excess of their steady state ratings during AC system disturbances when it is desirable and necessary to employ the HVDC link to stabilize the AC system. Operation in this manner is made possible by the valve thermal protection system which develops output signals analogous to the instantaneous solid state thyristor junction temperature for each valve structure employed in the HVDC power converter at each terminal of the HVDC power transmission system. The levels of these predicted thyristor junction temperature signals are continuously monitored and for successively higher, predicted, instantaneous, solid state thyristor junction temperatures, coordinated protective reactions are initiated which either alarm, reduce load or trip off the transmission system in order to protect the valves from permanent damage. Due to the use of redundancy and built-in internal monitoring capability, the probability of failure is reduced to a very low order.

Having described a preferred embodiment of the new and improved valve thermal protection system and HVDC power transmission system incorporating the same constructed in accordance with the invention, it is believed obvious that changes may be made in the construction disclosed which will be suggested to those skilled in the art in the light of the above teachings. It is therefore to be understood that changes may be made in the construction and practice of the invention described which are within the full intended scope of the invention as defined by the appended claims.

What is claimed is:

1. A thermal protection system for solid state valve means that includes at least one representative thyristor having a junction and a heat sink system for transferring heat from said junction to cooling fluid flowing past said heat sink system, said protection system comprising:
    (a) a solid state valve thermal analog model comprising an electrical network whose dynamic electrical operating characteristics are analogous to the thermal characteristics of said solid state valve means for a given value of instantaneous D.C. load current supplied through said solid state valve means, which thermal characteristics include the heat transfer to cooling fluid capability characteristics of said representative thyristor including its heat sink system,
    (b) means for deriving a first electrical signal representative of the value of the D.C. load current,
    (c) D.C. current to heat generation simulation network means responsive to said first electrical signal for deriving an output electrical power dissipation signal representative of the instantaneous value of the power dissipation within the junction of said representative thyristor for a given value of load current flowing through said junction,
    (d) means for applying said power dissipation signal to said thermal analog model,
    (e) output means connected to said thermal analog model for deriving an output junction temperature signal representative of the temperature of said thyristor junction, and
    (f) means for applying to said thermal model an additional electrical signal representative of the instantaneous temperature value of the cooling fluid flowing over said valve means and said heat sink system in such a way that said output junction temperature signal is modified by said additional signal.

2. The protection system of claim 1 in which said output junction temperature signal is caused to vary in magnitude directly with said additional signal with a predetermined time delay having a duration determined by the parameters of said thermal model.

3. The protection system of claim 2 in which said time delay duration is representative of the thermal response time of said valve means.

4. A Thermal protection system according to claim 1 wherein:
    (a) said thermal analog model comprises a plurality of individual resistor-capacitor networks serially interconnected to form sections in series of an RC ladder network having the power dissipation signal from said D.C. load current to heat generation simulation network means applied to one terminal of said ladder network,
    (b) said means of (f), claim 1, comprises means for applying to another terminal of said ladder network said additional electrical signal representative of the instantaneous temperature value of the cooling fluid flowing over said valve means and said heat sink system, and
    (c) said output junction temperature signal is derived across said thermal model.

5. A thermal protection system according to claim 4 wherein the serially interconnected resistor-capacitor networks that constitute the individual sections of the RC ladder network respectively comprises parallel connected resistor and capacitor elements, the values of the individual resistor and capacitor elements being determined from the expression $$R_{(t)} = R_1(1 - e^{-t/T_1}) + \ldots + R_n(1 - e^{-t/T_n})$$

where $R_{(t)}$ represents the instantaneous transient thermal resistance per thyristor of the solid state valve means, $R_n$ represents the degrees centigrade change in temperature per watt of power dissipated in said thyristor and its magnitude is obtained from known thermal characteristics of any given solid state thyristor to be modeled, t is the instantaneous value of time, $T_n$ in seconds is the time constant of the respective resistor-capacitor networks constituting the individual sections of the RC ladder network forming the valve thermal analog model, and e is the base of the natural logarithm.

6. A thermal protection system according to claim 4 wherein said means for applying to the said other terminal of the RC ladder network an electrical signal representative of the instantaneous temperature value of the cooling fluid flowing over said thyristor heat sink system comprises:
    (a) at least two thermo-electric temperature sensing means disposed in the flow path of the cooling fluid passing over said heat sink system for sensing the ambient temperature of the cooling fluid and deriving at least two output electric signals representative of the cooling fluid ambient temperature after passing over said heat sink system, and (b) voting circuit means responsive to the output from said at least two thermo-electric temperature sensing means for selectively supplying that electric signal representative of the highest sensed ambient cooling fluid temperature to the valve thermal analog model.

7. A thermal protection system according to claim 6 in combination with means for increasing automatically the magnitude of the power dissipation signal derived from the output from said current to heat generation simulation network means in accordance with increases in duty placed on said solid state valve means.

8. A thermal protection system for solid state valve means that includes at least one representative thyristor having a junction and a heat sink system for transferring heat from said junction to cooling fluid flowing past said heat sink system, said protection system comprising:

(a) a solid state valve thermal analog model comprising an electrical network whose dynamic electrical operating characteristics are analogous to the thermal characteristics of said solid state valve means for a given value of instantaneous D.C. load current supplied through said solid state valve means, which thermal characteristics include the heat transfer to cooling fluid capability characteristics of said representative thyristor including its heat sink system, (b) means for deriving a first electrical signal representative of the value of the D.C. load current, (c) D.C. current to heat generation simulation network means responsive to said first electrical signal for deriving an output electrical power dissipation signal representative of the instantaneous value of the power dissipation within the junction of said representative thyristor for a given value of load current flowing through said junction, (d) means for applying said power dissipation signal to said thermal analog model, (e) output means connected to said thermal analog model for deriving an output junction temperature signal representative of the temperature of said thyristor junction, and (f) means for automatically modifying even at a given load current the magnitude of the power dissipation signal derived from the output from said current to heat generation simulation network means in accordance with modifications in mode of operation of the solid state valve means being monitored.

9. A thermal protection system according to claim 8 wherein the solid state valve means comprise the solid state valves of a high voltage direct current power converter employed in an HVDC power transmission system and said means for modifying automatically the magnitude of the power dissipation signal increases said power dissipation signal responsive to at least certain of the valves in the high voltage direct current power converter being placed in a bypass-pair condition wherein the conductivity period of said certain valves is substantially increased.

10. A thermal protection system according to claim 8 wherein:

(a) said solid state valve means comprises the solid state valves of a high voltage direct current three-phase bridge-type converter employed in an HVDC power transmission system, (b) and said means for modifying automatically the magnitude of said power dissipation signal approximately triples said magnitude in response to at least certain of the valves in the converter being placed in a bypass-pair condition wherein the conductivity period of said certain valves is substantially tripled.

11. A thermal protection system for solid state valve means that includes at least one representative thyristor having a junction and a heat sink system for transferring heat from said junction to cooling fluid flowing past said heat sink system, said protection system comprising:

(a) a solid state valve thermal analog model comprising an electrical network whose dynamic electrical operating characteristics are analogous to the thermal characteristics of said solid state valve means for a given value of instantaneous D.C. load current supplied through said solid state valve means, which thermal characteristics include the heat transfer to cooling fluid capability characteristics of said representative thyristor including its heat sink system, (b) means for deriving a first electrical signal representative of the value of the D.C. load current, (c) D.C. current to heat generation simulation network means responsive to said first electrical signal for deriving an output electrical power dissipation signal representative of the instantaneous value of the power dissipation within the junction of said representative thyristor for a given value of load current flowing through said junction, (d) means for applying said power dissipation signal to said thermal analog model, (e) output means connected to said thermal analog model for deriving an output junction temperature signal representative of the temperature of said thyristor junction, and (f) said means for deriving a first electrical signal representative of the value of the load current comprises a load current sensor for sensing the actual value of the magnitude of the D.C. load current flowing through said solid state valve means, (g) current to voltage converting means is provided for converting the sensed current value to a voltage signal representative of the load current magnitude, (h) a first voltage to current converter means is provided responsive to the output from said current to voltage converter means and having its output current supplied to the current to heat generation simulation network means, (i) said current to heat generation simulation network means comprises an interconnected resistor-diode network having a non-linear impedance for providing an output voltage signal proportional to the product of said non-linear impedance and the value of a current signal supplied thereto from said first voltage to current converter means, (j) and second voltage to current converter means responsive to the voltage output from said resistor-diode network for converting the output voltage signal to a controlled current signal representative of the power dissipation within the junction of said representative thyristor for supply to said thermal analog model.

12. A solid state valve thermal protection system according to claim 11 further including:
  (a) third voltage to current converter means connected in parallel circuit relationship with said second voltage to current converter means between the output of said current to heat generation simulation network means and the input of the valve thermal analog model, and
  (b) selectively operable switching means automatically responsive to extraneous control signals representative of the duty being placed on said valve means being monitored for selectively applying the output from said third voltage to current converter means to said thermal analog model.

13. A thermal protection system according to claim 12 wherein said thermal analog model comprises a plurality of individual resistor-capacitor networks serially interconnected to form sections in series of an RC ladder network having the power dissipation signal from said current to heat generation simulation network means applied to one terminal thereof and further including means for applying to another terminal of the ladder network a heat sink ambient cooling fluid temperature electric signal representative of the instantaneous temperature value of the cooling fluid flowing over said valve means and said heat sink system, said serially interconnected resistor-capacitor networks respectively comprise resistor and capacitor elements connected in parallel, the values of the resistor and capacitor elements being determined from the expression:

$$R_{(t)} = R_1(1 - e^{-t/T_1}) + \ldots + R_n(1 - e^{-t/T_n})$$

where $R_{(t)}$ represents the transient thermal resistance per thyristor of the solid state valve means, $R_n$ represents the degrees centigrade change in temperature per watt of power dissipated in said thyristor and its magnitude is obtained from known thermal characteristics of a thyristor to be modeled, t is the instantaneous value of time, $T_n$ in seconds is the time constant of the respective resistor-capacitor networks constituting the individual sections of said RC ladder network, and e is the base of said natural logarithm, and wherein said means for applying to said other terminal of the ladder network a heat sink ambient temperature electric signal representative of the instantaneous temperature value of the cooling fluid flowing over said heat sink system comprises at least two thermo-electric temperature sensing means disposed in the flow path of said cooling fluid for sensing the ambient temperature of said cooling fluid and deriving at least two output electric signals representative of the cooling fluid ambient temperature after passing over said heat sink system, and voting circuit means responsive to the output from said at least two thermo-electric temperature sensing means for selectively supplying that signal representative of the highest sensed ambient cooling fluid temperature to the thermal analog model.

14. A thermal protection system according to claim 13 further including output signal level sensing circuit means responsive to said output means for comparing the output signal level derived from said thermal analog model to a plurality of different reference signal level values and deriving a plurality of different priority action output signals in the event one or more of the reference signal level values is exceeded by the output signal derived from the output of said thermal analog model.

15. A thermal protection system wherein there are a plurality of at least three redundant identical channels constructed in accordance with claim 14 for each individual value means being monitored and further including at least two voting circuit means responsive to the outputs from the level sensing circuit means of all of the channels for selecting at least two out of three channels whose response indicates an alarm condition was detected by their respective signal level sensing circuit means, with said voting circuit means providing redundant output indications of an alarm condition only in the event that at least two out of three channels indicate such a condition exists.

16. A thermal protection system according to claim 15 further including valve thermal protection system monitor means coupled to said thermal analog model for monitoring the performance of the valve thermal protection system and for deriving output indications of at least the maximum value of the heat sink system cooling fluid ambient temperature, the difference between the maximum and minimum sensed values of heat sink system cooling fluid ambient temperature, the maximum value of the thyristor junction temperature and the difference between the maximum and minimum sensed values of said thyristor junction temperature.

17. A thermal protection system according to claim 16 wherein the solid state valve means comprises the solid state valves of a high voltage direct current power converter employed in an HVDC power transmission system and the switching means responsive to extraneous control signals for selectively applying the output from said third voltage to current converter means to the solid state valve thermal analog model to thereby increase the magnitude of the junction temperature signal is responsive to at least certain of the valves in the high voltage direct current power converter being placed in a bypass-pair condition whereby the conductivity period of said certain valves is substantially increased.

18. A thermal protection system for solid state valve means included in a High Voltage D.C. transmission system including a plurality of power sources capable of supplying current to the valve means, said valve means including; at least one representative thyristor having a junction and a heat sink system for transferring heat from said junction to cooling fluid flowing past said heat sink system, said protection system comprising:
  (a) a solid state valve thermal analog model comprising an electrical network whose dynamic electrical operating characteristics are analogous to the thermal characteristics of said solid state valve means for a given value of instantaneous D.C. load current supplied through said solid state valve means, which thermal characteristics include the heat transfer to cooling fluid capability characteristics of said representative thyristor including its heat sink system,
  (b) means for deriving a first electrical signal representative of the value of the D.C. load current,
  (c) D.C. current to heat generation simulation network means responsive to said first electrical signal for deriving an output electrical power dissipation signal representative of the instantaneous value of the power dissipation within the junction of said representative thyristor for a given value of load current flowing through said junction,
  (d) means for applying said power dissipation signal to said thermal analog model, (e) output means connected to said thermal analog model for deriving an output junction temperature signal representative of the temperature of said thyristor junction, and (f) output signal level sensing circuit means responsive to said output means for comparing the output junction temperature signal level derived from said thermal analog model to a plurality of different reference signal level values and deriving a plurality of different priority action output alarm signals in the event one or more of the reference signal level values is exceeded by said output junction temperature signal, (g) means for signaling a warning when a first one of said reference signal level values is exceeded, (h) means for automatically reducing the current order of the D.C. system that includes said valve means when a second one of said reference signal level values is exceeded, (i) and means for establishing a bypass around said valve means when a third one of said reference signal level values is exceeded.

19. A thermal protection system wherein there are a plurality of at least three redundant identical channels constructed in accordance with claim 18 for each individual solid state valve means being monitored and further including at least two voting circuit means responsive to the outputs from the level sensing circuit means of all of the channels for selecting at least two out of three channels whose response indicates an alarm condition was detected by their respective signal level sensing circuit means, with said voting circuit means providing special output indication of an alarm condition only in the event that at least two out of three channels indicate such a condition exists.

20. A thermal protection system according to claim 19 further including valve thermal protection system monitor means coupled to said thermal analog model for monitoring the performance of the valve thermal protection system and for deriving output indications of at least the maximum value of the heat sink system cooling fluid ambient temperature, the difference between the maximum and minimum sensed values of heat sink system cooling fluid ambient temperature, the maximum value of the thyristor junction temperature and the difference between the maximum and minimum sensed values of said thyristor junction temperature.

21. A thermal protection system for solid state valve means that includes at least one representative thyristor having a junction and a heat sink system for transferring heat from said junction to cooling fluid flowing past said heat sink system, said protection system comprising:

(a) a solid state valve thermal analog model comprising an electrical network whose dynamic electrical operating characteristics are analogous to the thermal characteristics of said solid state valve means for a given value of instantaneous D.C. load current supplied through said solid state valve means, which thermal characteristics include the heat transfer to cooling fluid capability characteristics of said representative thyristor including its heat sink system, (b) means for deriving a first electrical signal representative of the value of the D.C. load current, (c) D.C. current to heat generation simulation network means responsive to said first electrical signal for deriving an output electrical power dissipation signal representative of the instantaneous value of the power dissipation within the junction of said representative thyristor for a given value of load current flowing through said junction, (d) means for applying said power dissipation signal to said thermal analog model, (e) output means connected to said thermal analog model for deriving an output junction temperature signal representative of the temperature of said thyristor junction, and (f) valve thermal protection system monitor means coupled to said thermal analog model for monitoring the performance of the valve thermal protection system and for deriving output indications of at least the maximum value of the heat sink system cooling fluid ambient temperature, the difference between the maximum and minimum sensed values of heat sink system cooling fluid ambient temperature, the maximum value of the thyristor junction temperature and the difference between the maximum and minimum sensed values of said thyristor junction temperature.

* * * * *